US011863053B2

(12) United States Patent
Remboski et al.

(10) Patent No.: US 11,863,053 B2
(45) Date of Patent: Jan. 2, 2024

(54) LUBRICANT SUPPORTED ELECTRIC MOTOR WITH A MONITORING PORT

(71) Applicant: Neapco Intellectual Property Holdings, LLC, Farmington Hills, MI (US)

(72) Inventors: Donald Remboski, Ann Arbor, MI (US); Jacqueline Dedo, Wolverine Lake, MI (US); Mark Versteyhe, Oostkamp (BE)

(73) Assignee: NEAPCO INTELLECTUAL PROPERTY HOLDINGS, LLC, Farmington Hills, MI (US)

(*) Notice: Subject to any disclaimer, the term of this patent is extended or adjusted under 35 U.S.C. 154(b) by 294 days.

(21) Appl. No.: 17/064,684

(22) Filed: Oct. 7, 2020

(65) Prior Publication Data

US 2021/0104936 A1 Apr. 8, 2021

Related U.S. Application Data

(60) Provisional application No. 62/912,122, filed on Oct. 8, 2019.

(51) Int. Cl.
*H02K 9/19* (2006.01)
*H02K 9/193* (2006.01)
(Continued)

(52) U.S. Cl.
CPC ............. *H02K 9/193* (2013.01); *F16N 29/02* (2013.01); *B60K 7/0007* (2013.01);
(Continued)

(58) Field of Classification Search
CPC ... B60K 1/02; H02K 7/00; H02K 7/08; H02K 7/088; H02K 5/16; H02K 5/167;
(Continued)

(56) References Cited

U.S. PATENT DOCUMENTS 3,101,224 A * 8/1963 Adams ............... F16C 32/0659
384/115
3,119,639 A * 1/1964 Adams ............... F16C 32/0648
384/121
(Continued)

FOREIGN PATENT DOCUMENTS

CN 103089810 A 5/2013
DE 102007022221 A1 11/2008
(Continued)

*Primary Examiner* — Tran N Nguyen
(74) *Attorney, Agent, or Firm* — Dickinson Wright PLLC

(57) ABSTRACT

A lubricant supported electric motor includes a stator presenting an outer raceway and a rotor extending along an axis and rotatably disposed within the stator. The rotor presents an inner raceway disposed in spaced relationship with said outer raceway to define at least one hydrostatic support chamber disposed therebetween. A lubricant is disposed in the hydrostatic support chamber for supporting the rotor within the stator. A monitoring port is disposed in fluid communication with the at least one hydrostatic support chamber, and a sensor is coupled with the monitoring port for monitoring an operating characteristic of the lubricant disposed in said at least one hydrostatic support chamber. This monitored operating characteristic is then used to determine a real-time operating condition of the lubricant supported electric motor.

10 Claims, 1 Drawing Sheet

(51) Int. Cl.
*F16N 29/02* (2006.01)
*B60K 7/00* (2006.01)

(52) U.S. Cl.
CPC ...... *F16N 2210/18* (2013.01); *F16N 2250/04* (2013.01); *H02K 2205/09* (2013.01)

(58) Field of Classification Search
CPC ........ H02K 5/1677; H02K 9/19; H02K 9/193; F16N 29/00; F16N 29/02; F16C 32/06; F16C 32/064; F16C 32/0644
See application file for complete search history.

(56) References Cited

U.S. PATENT DOCUMENTS

| | | | | |
|---|---|---|---|---|
| 4,448,460 | A | * | 5/1984 | Yamamoto .............. F16C 32/06 384/12 |
| 5,310,264 | A | * | 5/1994 | Mishima ............ B23Q 11/0003 384/100 |
| 2019/0093757 | A1 | | 3/2019 | Remboski et al. |

FOREIGN PATENT DOCUMENTS

| | | | | |
|---|---|---|---|---|
| EP | 1193411 | * | 4/2002 | |
| EP | 2108832 | A1 | 10/2009 | |
| JP | 3569668 | * | 9/2004 | .............. F16C 17/00 |

\* cited by examiner

LUBRICANT SUPPORTED ELECTRIC MOTOR WITH A MONITORING PORT

CROSS-REFERENCE TO RELATED APPLICATION

The subject application claims priority to U.S. Provisional Application Ser. No. 62/912,122 filed on Oct. 8, 2019, the entire disclosure of which is incorporated herein by reference.

FIELD OF THE DISCLOSURE

The present disclosure relates generally to a lubricant supported electric motor. More specifically, the present disclosure relates to a lubricant supported electric motor with at least one monitoring port for improving the operating characteristics and performance of the lubricant supported electric motor.

BACKGROUND OF THE INVENTION

This section provides a general summary of background information and the comments and examples provided in this section are not necessarily prior art to the present disclosure.

Various drivelines in automotive, truck, and certain off-highway applications take power from a central prime mover and distribute the power to the wheels using mechanical devices such as transmissions, transaxles, propeller shafts, and live axles. These configurations work well when the prime mover can be bulky or heavy, such as, for example, various internal combustion engines ("ICE"). However, more attention is being directed towards alternative arrangements of prime movers that provide improved environmental performance, eliminate mechanical driveline components, and result in a lighter-weight vehicle with more space for passengers and payload.

"On wheel", "in-wheel" or "near-wheel" motor configurations are one alternative arrangement for the traditional ICE prime mover that distributes the prime mover function to each or some of the plurality of wheels via one or more motors disposed on, within, or proximate to the plurality of wheels. For example, in one instance, a traction motor, using a central shaft though a rotor and rolling element bearings to support the rotor, can be utilized as the "on wheel", "in wheel" or "near wheel" motor configuration. In another instance, a lubricant supported electric motor, such as described in U.S. application Ser. No. 16/144,002, can be utilized as the "on wheel", "in wheel" or "near wheel" motor configuration. While each of these motor configurations result in a smaller size and lighter weight arrangement as compared to the prime movers based on the internal combustion engine, they each have certain drawbacks and disadvantages.

For example, the utilization of traction motors as the "on wheel", "in wheel" or "near wheel" configuration still results in motors that are too heavy and not robust enough to shock loading to be useful for wheel-end applications. In other words, present traction motors are large, heavy structures supported by rolling element bearings, which are too heavy and large to be practical for wheel end applications. Similarly, the utilization of a lubricant supported electric motors as the "on wheel", "in wheel" or "near wheel" motor in an automotive or land vehicle application results in an arrangement with some performance issues when it is subjected to the wide range of dynamic forces encountered during operation at the wide range of speeds encountered in a prime-mover application. Present arrangements of lubricant supported electric motors are not robust enough, and thus not designed to perform well under all the conditions and dynamic forces encountered in a wheel-end motor arrangement. Additionally, present arrangements of lubricant supported electric motors in "on-wheel" applications are static and very conservatively designed systems that have very limited performance measurements, and thus have higher bearing friction/shear loss and shorter life. Accordingly, a need remains for an improved lubricant supported electric motor which provides improved operating characteristics in real-time.

SUMMARY OF THE INVENTION

The subject invention is generally directed to a lubricant supported electric motor that includes a stator and a rotor movably disposed within the stator. The stator presents an outer raceway and the rotor presents an inner raceway disposed in spaced relationship with the outer raceway to define at least one hydrostatic support chamber disposed therebetween. A lubricant is disposed in the at least one hydrostatic support chamber for supporting the rotor within the stator. A monitoring port is disposed in fluid communication with the at least one hydrostatic support chamber, and a sensor is coupled with the monitoring port for monitoring an operating characteristic of the lubricant or the hydrostatic support chamber. The monitored operating characteristic is analyzed to determine an operating condition of the lubricant supported electric motor in real time, such as the detection of lubricant supply faults, unstable motor operation, or other real-time diagnostics and prognostics. The lubricant supported electric motor with a monitoring port and sensor is also light and small, and thus contributes to the overall design strategy for eliminating weight and size from automobiles and land vehicles. Other advantages will be appreciated in view of the following more detailed description of the subject invention.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF THE ENABLING EMBODIMENTS

Example embodiments of a lubricant supported electric motor in accordance with the present disclosure will now be more fully described. Each of these example embodiments are provided so that this disclosure is thorough and fully conveys the scope of the inventive concepts, features and advantages to those skilled in the art. To this end, numerous specific details are set forth such as examples of specific components, devices and mechanisms associated with the lubricant supported electric motor to provide a thorough understanding of each of the embodiments associated with the present disclosure. However, as will be apparent to those skilled in the art, not all specific details described herein need to be employed, the example embodiments may be embodied in many different forms, and thus should not be construed or interpreted to limit the scope of the disclosure.

Figure 1:
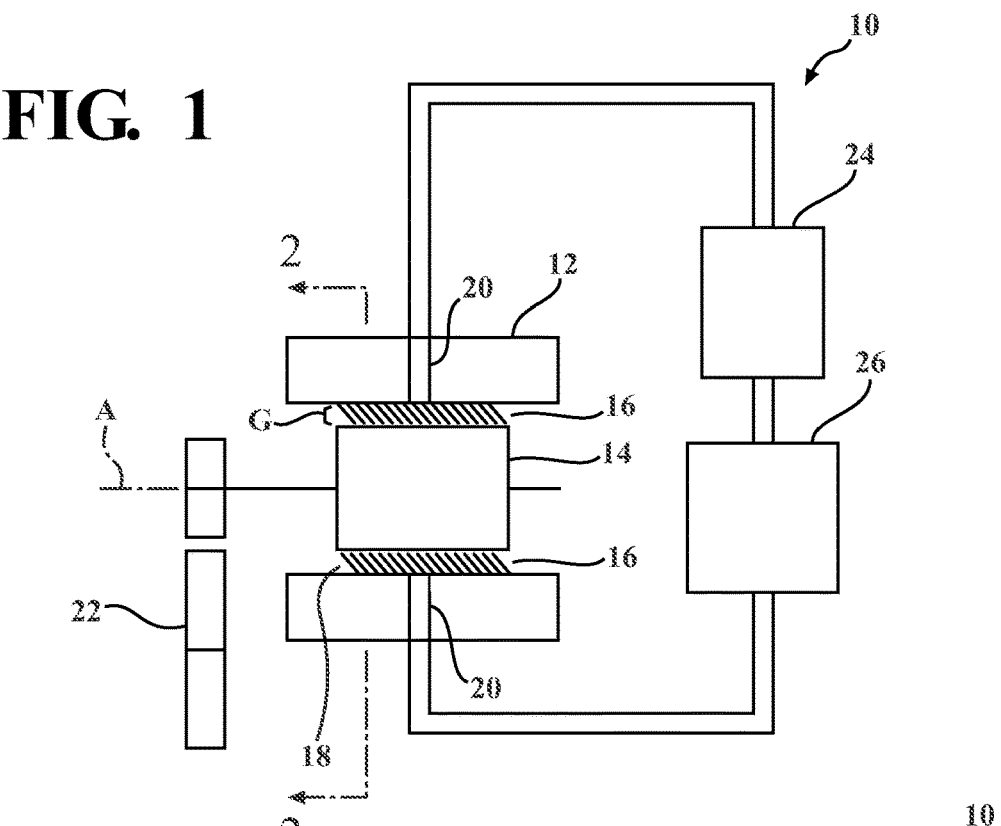
FIG. 1 is a schematic view of a lubricant supported electric motor according to an aspect of the subject disclosure.
Figure 2:
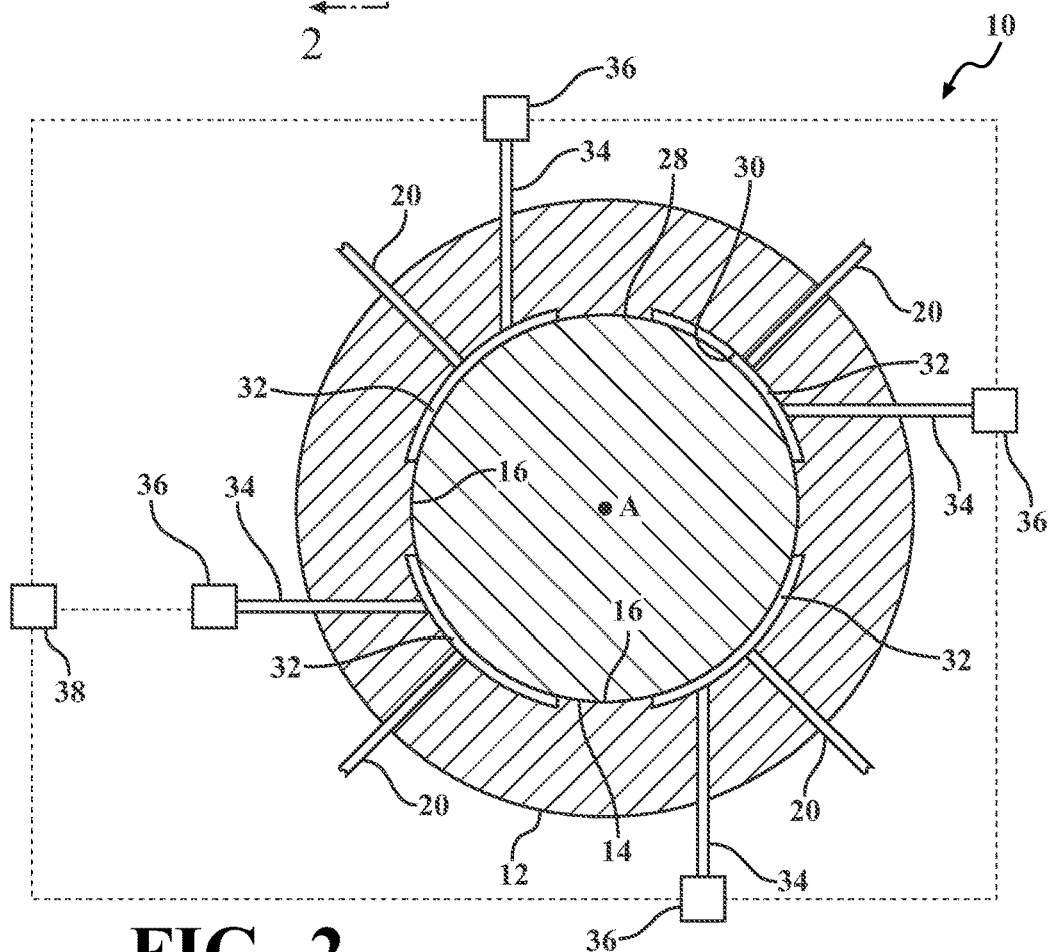
FIG. 2 is a cross-sectional view of the lubricant supporting electric motor taken along 2-2 of FIG. 1 illustrating a monitoring port and sensor in communication with a hydrostatic support chamber.

FIGS. 1-2 illustrate a lubricant supported electric motor 10 in accordance with an aspect of the disclosure. As best illustrated in FIG. 1, the lubricant supported electric motor 10 includes a stator 12 and a rotor 14 extending along an axis A and movably (i.e., rotatably) disposed within the stator 12 to define a gap 16 (also shown as "G" in FIG. 1) therebetween. In an alternative arrangement, the stator 12 and the rotor 14 can be reversed, with the stator 12 extending along the axis A and the rotor 14 rotatably disposed around the stator 12, without departing from the scope of the subject disclosure. A lubricant 18 is disposed in the gap 16 for supporting the rotor 14 within the stator 12, and providing continuous contact between these components. The lubricant 18 may therefore act as a buffer (e.g., suspension) between the stator 12 and the rotor 14 minimizing or preventing contact therebetween. In other words, the lubricant 18 prevents direct contact between the stator 12 and rotor 14 and provides an electric lubricant supported motor 10 which is robust to shock and vibration loading due to the presence of the lubricant 18. Additionally, and alternatively, a substantially incompressible lubricant 18 may be used in order to minimize the gap between the stator 12 and rotor 14.

As further illustrated FIG. 1, the stator 12 defines a passageway 20 disposed in fluid communication with the gap 16 for introducing the lubricant 18. However, the passageway 20 could be provided on any other components of the lubricant supported electric motor 10 without departing from the subject disclosure. According to an aspect, the lubricant 18 may be cycled or pumped through the passageway 20 and into the gap 16 in various ways. For example, a high pressure source (e.g., a pump) 24 of the lubricant 18 may be fluidly coupled to a low pressure source (e.g., a sump) 26 of the lubricant 18, where the lubricant 18 may move from the high pressure source to the lower pressure source, through the passageway 20 and into the gap 16. Rotation of the rotor 14 relative to the stator 12 may operate as a self-pump to drive lubricant 18 through the passageway 20 and into the gap 16.

As further illustrated in FIG. 1, the rotor 14 is interconnected to a drive assembly 22 for coupling the lubricant supported electric motor 10 to one of the plurality of wheels of a vehicle. For example, in one instance, the drive assembly 22 may include a planetary gear system. Alternatively, the drive assembly 22 may include one or more parallel axis gears. The stator 12 and rotor 14 are configured to exert an electromagnetic force therebetween to convert electrical energy into mechanical energy, moving the rotor 14 and ultimately driving the wheel coupled to the lubricant supported electric motor 10 via the drive assembly 22. The drive assemblies 20 may provide one or more reduction ratios between the lubricant supported electric motor 10 and the wheel in response to movement of the rotor 14.

As best illustrated in FIG. 2, the rotor 14 presents an inner raceway 28 and the stator 12 presents an outer raceway 30. The inner and outer raceways 28, 30 collectively define at least one hydrostatic support chamber 32 which is established by a portion of the gap 16 and receives the lubricant 18 for supporting the rotor 14 within the stator 12. For example, the hydrostatic support chamber 32 which is established in the gap 16 between the inner and outer raceways 28, 30 determines a dynamic pressure developed when the lubricant supported electric motor 10 is in hydrodynamic mode. The gap 16 between the inner and outer raceways 28, 30 also determines the pressure in the hydrostatic support chamber 32 when the lubricant supported electric motor 10 is in hydrostatic mode. In a preferred embodiment, the at least one hydrostatic support chamber 32 includes a plurality of hydrostatic support chambers 32 spaced circumferentially around and between the stator 12 and the rotor 14 and which each have their individualized pressure in the hydrodynamic and hydrostatic modes. For example, as illustrated in FIG. 2, in a preferred arrangement, the at least one hydrostatic support chamber 32 can include four hydrostatic support chambers 32 circumferentially spaced from one another around the axis A. However, any number of hydrostatic support chambers 32 can be utilized without departing from the scope of the subject disclosure. As further illustrated in FIG. 2, the stator 12 defines a plurality of passageways 20 each disposed in fluid communication with a respective one of the hydrostatic support chambers 32 for supplying lubricant thereto.

As further illustrated in FIG. 2, the lubricant supported electric motor 10 includes a monitoring port 34 disposed in fluid communication with each hydrostatic support chamber 32. A sensor 36 is coupled to the monitoring port 30 for sensing the operating characteristic of the lubricant 18 disposed within the at least one hydrostatic support chamber 28. For example, the sensor 36 can be a pressure sensor configured to sense a pressure of the lubricant 18 disposed within the at least one hydrostatic support chamber 28. However, the sensor 36 could also be comprised of other sensors 36, such as a temperature sensor for sensing a temperature of the lubricant 18 or a viscosity sensor for sensing a viscosity of the lubricant, without departing from the scope of the subject disclosure.

As further illustrated in FIG. 2, when the at least one hydrostatic support chamber 32 includes a plurality of hydrostatic support chambers 32, a monitoring port 34 and sensor 36 can be disposed in communication with each hydrostatic support chamber 32. In other words, in a preferred arrangement, each hydrostatic support chamber 32 includes its own respective monitoring port 34 and sensor 36 for providing individualized monitoring of the plurality of hydrostatic support chambers 32. The utilization of the monitoring port 34 and the sensor 36 advantageously improves the performance of the lubricant supported electric motor 10 by providing the ability to detect operating characteristics of the lubricant 18 disposed within each of the hydrostatic support chambers 28, which is used and analyzed to detect certain operating characteristics of the lubricant supported electric motor 10 such as oil supply faults, stable or instable motor operation, as well as others. In other words, the monitoring port 30 and the sensor 32 facilitates real-time diagnostics and prognostics for the lubricant supported electric motor 10.

As illustrated in FIG. 2, each sensor 36 is preferably electrically connected to a controller 38 for sending the monitored operating characteristic of the lubricant 18 and/or hydrostatic support chamber 32 to the controller 38 for further evaluation to determine the operating characteristic of the lubricant supported electric motor 10 and provide the real-time diagnostics and prognostics. For example, the operating characteristics (e.g., pressure, temperature, viscosity) sensed by the plurality of sensors 32 can be used by the controller 38 to:

verify correct oil flow into the hydrostatic support chamber 28 using a pressure-based flow model. For example, at a known oil flow rate a known pressure should result. If the pressure is too high this may indicate inner to outer raceway clearances that are too close. If the pressure is too low this may indicate leakage in the oil supply or an inner to outer raceway clearance that is too large;

observe rotor vibration related to pressure fluctuations within the hydrostatic support chamber 32 (e.g. rotor motions such as translation, rocking, whirl). For example pressure fluctuations may be caused by the rotor moving away from being centered in the stator and changing the inner to outer raceway clearance;

observe rotor centering related to pressure relationships of hydrostatic support chambers 32 diametrically opposed to each other. For example, when the rotor moves closer to a chamber on the top of the stator, the pressure in that chamber will increase due to the tighter clearance between the inner raceway and the outer raceway. At the same time, the rotor will move further away from the chamber at the bottom of the stator, which will decrease the pressure in the chamber due to the looser clearance between the inner and outer raceway. The combination of increasing pressure at the top and decreasing pressure at the bottom indicates that the rotor is moving off of center;

estimate rotor position measurement to allow feedback control of rotor position. For example, the rotor centering position can be estimated using the method described above. This position estimate can be used to change the electric current supplied to the motor or the oil pressure supplied to the motor to cause the rotor to stay as close to a centered position as possible;

estimate lubricant properties (e.g., viscosity) when used in conjunction with oil pump volumetric flow. For example, as the lubricant heats up it will typically become less viscous, which results in a lower chamber pressure for a given flow rate. Observing the decrease in pressure across multiple chambers may be an indicator of reduced viscosity; and diagnose system faults in the lubricant, lubricant pump, and pressure sensing systems. For example, for a given flow rate of oil into a chamber, if the pressure is not within a known normal range, than a fault in the oil supply or raceways is indicated.

In an embodiment, the controller 38 is also disposed in communication with a component of the lubricant supported electric motor 10 and can use the monitored characteristic of the lubricant 18 and/or hydrostatic support chamber 28 in conjunction with other measured parameters of the lubricant supported electric motor 10 (e.g., motor speed, motor temperature, central oil supply pressure, etc.) to provide further diagnostics and prognostics of the lubricant supported electric motor 10.

The incorporation of monitoring port 34 and sensor 36 advantageously provides for optimized performance and operating characteristics for the lubricant supported electric motor 10 in real-time. In other words, the monitoring port 34 and sensor 36 allows for the monitoring and diagnosing of the motor's performance in real-time using, for example, pressure measurements of the lubricant 18 in the hydrostatic support chamber 32. This improved monitoring of the motor's performance ultimately leads to better overall performance of the lubricant supported electric motor 10 compared to its static and very conservatively designed counterparts.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A lubricant supported electric motor comprising:
a stator presenting an outer raceway;
a rotor extending along an axis and rotatably disposed within said stator;
said rotor presenting an inner raceway disposed in spaced relationship with said outer raceway to define at least one hydrostatic support chamber therebetween;
a lubricant comprised of oil disposed in said at least one hydrostatic support chamber for supporting said rotor within said stator,
a monitoring port disposed in fluid communication with said at least one hydrostatic support chamber; and
a sensor coupled with said monitoring port and configured to monitor an operating characteristic of said lubricant disposed in said at least one hydrostatic support chamber.

2. The lubricant supported electric motor as set forth in claim 1, further comprising a controller disposed in electrical communication with said sensor for receiving said monitored operating characteristic of said lubricant disposed in said hydrostatic support chamber.

3. The lubricant supported electric motor as set forth in claim 1, wherein said sensor is comprised of a pressure sensor configured to sense a pressure of said lubricant disposed within said at least one hydrostatic support chamber.

4. The lubricant supported electric motor as set forth in claim 1, wherein said sensor is comprised of a temperature sensor configured to sense a temperature of said lubricant disposed within said at least one hydrostatic support chamber.

5. The lubricant supported electric motor as set forth in claim 2, wherein said at least one hydrostatic support chamber includes a plurality of hydrostatic support chambers disposed circumferentially about said axis in spaced relationship with one another.

6. The lubricant supported electric motor as set forth in claim 5, further comprising a plurality of monitoring ports each disposed in fluid communication with a respective one of said plurality of hydrostatic support chambers and a plurality of sensors each disposed in communication with a respective one of said plurality of monitoring ports.

7. The lubricant supported electric motor as set forth in claim 6, wherein said controller is disposed in electrical communication with each of said plurality of sensors and configured to receive and analyze operating characteristics of said lubricant disposed in each of said plurality of hydrostatic support chambers.

8. The lubricant supported electric motor as set forth in claim 1, wherein said rotor is operably connected to a final drive device that is interconnected to a wheel of a vehicle.

9. The lubricant supported electric motor as set forth in claim 1, wherein said stator defines a passageway disposed in fluid communication with said at least one hydrostatic support chamber for supplying said lubricant.

10. The lubricant supported electric motor as set forth in claim 5, wherein said stator defines a plurality of passageways each disposed in fluid communication with a respective one of said plurality of hydrostatic support chambers for supplying said lubricant.

* * * * *